Patented Aug. 14, 1934

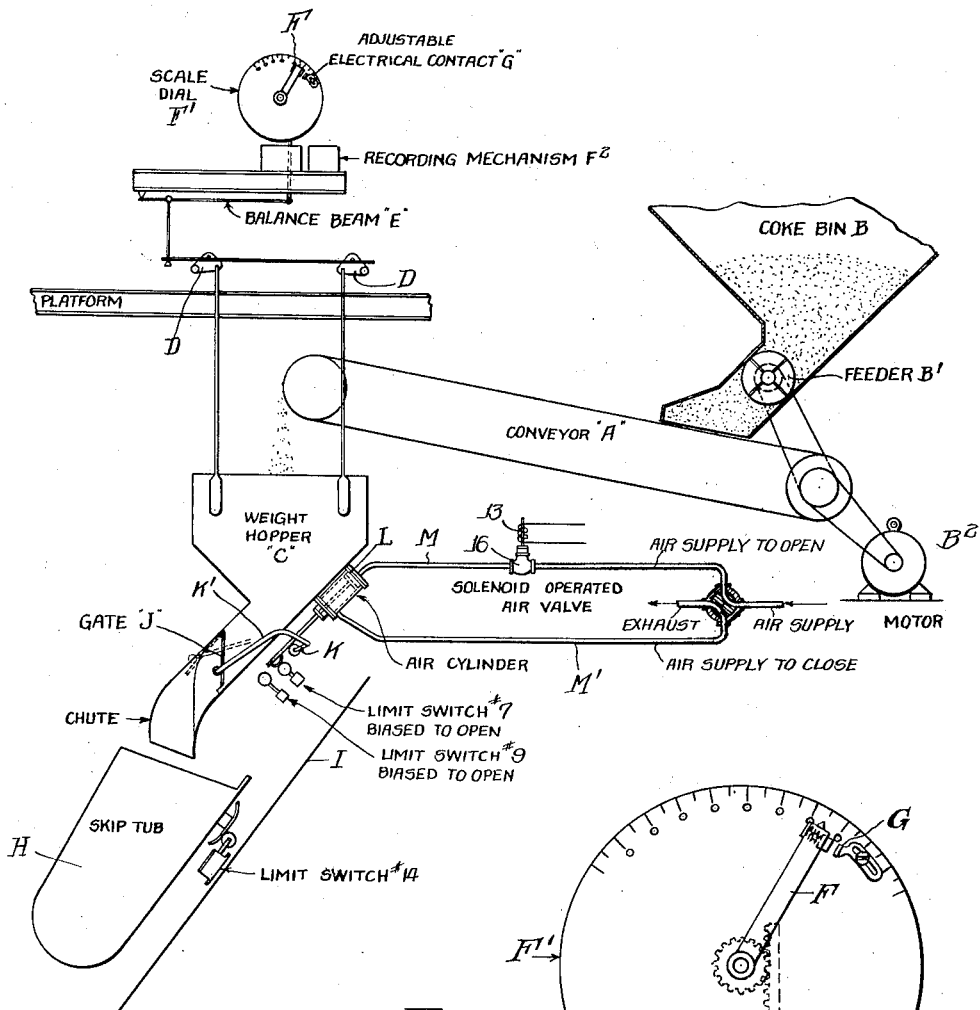

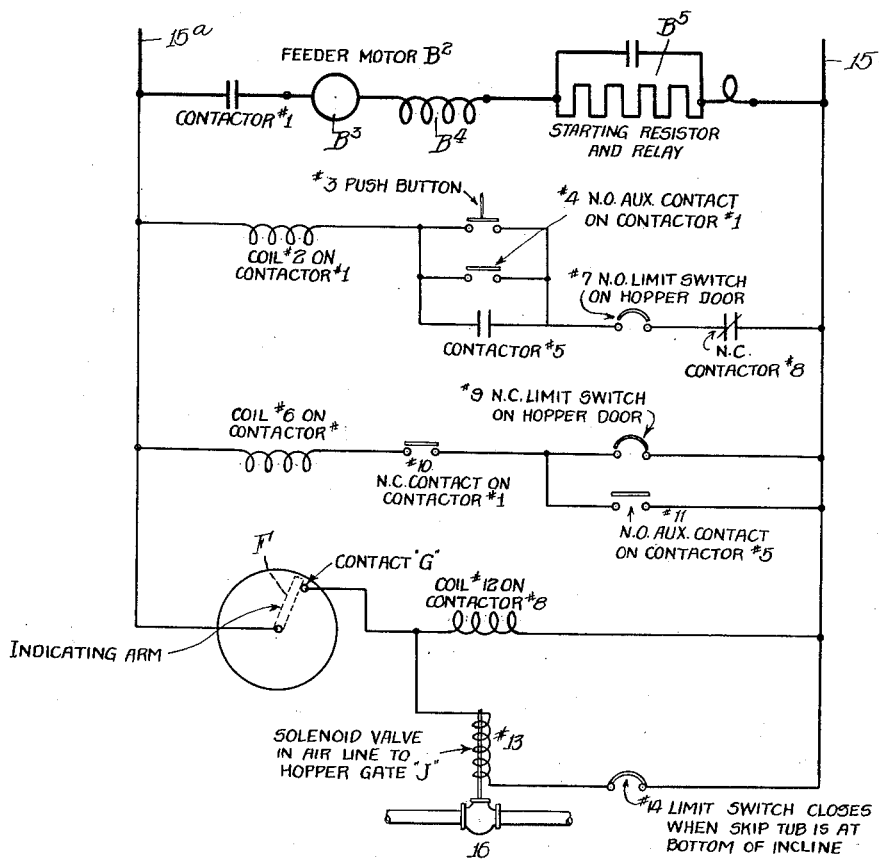

1,970,291

UNITED STATES PATENT OFFICE 1,970,291

WEIGHING AND DELIVERY MECHANISM

Edgar P. Everhard, Chicago, Ill., assignor to Freyn Engineering Company, Chicago, Ill., a corporation of Maine Application July 19, 1928, Serial No. 293,914

5 Claims. (Cl. 214—2)

The present invention relates to improvements in weighing and delivery mechanism.

As the description proceeds it will be understood that the present invention has a general application, but for purposes of description particular reference will be had to means for supplying coke or other material to a blast furnace.

It is common practice in the operation of blast furnaces for the operator to approximate the weight of coke or other material which is being delivered to the blast furnace, it being a common expedient for the operator to judge the weight of such material by measuring the bulk thereof.

An object of the present invention is to provide means for delivering material with means by which material may be conveniently weighed while in the process of being delivered.

A further object is to provide a delivery system according to which the operator may discharge material only when a predetermined weight thereof has been collected.

A further object is to provide a system for delivering material which has the advantage that the operator may discharge same only when a predetermined weight thereof has been collected and when a receptacle is in position to receive said material.

A further object is to provide a weighing and delivery system which is well adapted to meet the needs of commercial operation.

Further objects will appear as the description proceeds.

Referring to the drawings—

Figure 1 is a diagrammatic view showing certain fundamental features of the present invention;

Figure 1a is a view of a portion of Figure 1 showing the parts on an enlarged scale; and Figure 2 is a wiring diagram adapted to cooperate with the structure shown in Figure 1.

The reference letter A indicates a conveyor which is illustrated as being of the belt type, which conveyor is positioned to receive material from the bin B. Said bin B is provided with the feeder B1. The conveyor A and feeder B1 are operated by the motor B2, which motor is adapted to be started and stopped in response to certain weighing apparatus to be referred to hereinafter.

In addition to the feeder B1, a screen of any preferred design (such as may be purchased in the open market) may be inserted for the purpose of separating fine material from the lumps of material conveyed by the conveyor A.

As shown in Figure 1, the conveyor A is adapted to deliver material to the weigh hopper C, which is suspended from scale arms D—D, which scale arms are connected to the balance beam E. Said balance beam is connected, through mechanism which need not be described in detail, to the indicating arm F of a scale dial F1. Cooperatively associated with the balance beam E is certain recording mechanism F2, which need not be described in detail herein, but which, as will be readily understood, will give a record of the operations of the scale beam E, or, in other words, will give a continuous record of the number and weight of the loads of material delivered to and discharged from the weigh hopper C. Said indicating arm F is provided with an electrical contact adapted to engage a relatively fixed contact G. Though said contact G is referred to as relatively fixed, it will be understood that said contact is preferably adjustable, whereby engagement between the arm F and contact G may be had at predetermined selectable positions of the arm F corresponding to predetermined weights of material within the weigh hopper C. The letter H indicates a skip tub adapted to travel along the inclined track I. Said skip tub H, which is also referred to in the art as a car, bucket, or skip, is representative of a skip hoist such as is well known to those skilled in the art. Such skip hoists may include either one or two tubs or buckets. Only one skip tub is illustrated. Though the drawings show only a single skip tub, it will be understood that the invention is not limited to a single skip arrangement.

According to the disclosure of Figure 1, the weight hopper C is provided with the gate J, which gate J may be operated by means of a crank K, and connecting rod K1, the positions of which are responsive to the air supply to the air cylinder L. Said air cylinder L is provided with the two supply lines M and M'. The details of the cylinder L and the connections thereto of the lines M and M' need not be described in detail. It will be sufficient to state that when air pressure is supplied through the line M, the crank K will be moved to open the gate J, as indicated by dotted lines. When air is supplied through the line M' the crank K will be operated to close the gate J. Air supplied to the lines M and M' may be selectably controlled by means of the four-way valve N, which may be of usual construction and which may be connected to any convenient source of air supply. The line M is provided with the solenoid operated air valve, which, as will be explained hereinafter, permits the passage of air to open the gate J only under predetermined conditions.

Referring now to the electrical operating and controlling mechanism, the feeder motor B2 is provided with the armature B3 and series field winding B4. Connected in circuit with said armature and field winding is the usual starting resistor and relay mechanism, indicated as a whole by the reference character B5.

The numeral 1 indicates a normally open contactor, which contactor is adapted to be operated by the coil 2. Said coil 2 is responsive to the push button switch 3. The numeral 4 indicates an auxiliary contact on the contactor 1, which auxiliary contact 4 is biased to open position, or, expressed in other language, is normally open. Said auxiliary contact 4 is bridged across the push button 3. Bridged across the push button 3 and the auxiliary contact 4 is the normally open contactor 5. Said contactor 5 is provided with the operating coil 6. The numeral 7 indicates a normally open limit switch adapted to be closed when the hopper gate J is in closed position. Expressed in other language, the limit switch 7 is biased to open position, but is closed by means of the gate operating mechanism (see Figure 1) when the gate J is closed. The numeral 8 indicates a normally closed contactor connected in circuit with the normally open limit switch 7. The numeral 9 indicates a normally open limit switch, which is responsive to the operating mechanism for the gate J of the weigh hopper C. Said limit switch 9, being biased to open position, is open when the gate J is closed. The numeral 10 indicates a normally closed auxiliary contact on the contactor 1, while the numeral 11 indicates a normally open auxiliary contact on the contactor 5. The numeral 12 indicates the operating coil of the contactor 8 above referred to. Connected across the coil 12 is a circuit including the solenoid 13 and the limit switch 14. Said limit switch 14 is responsive to the position of the skip tub H, as shown in Figure 1. Said limit switch 14 closes when the skip tub is in material receiving position under the weigh hopper C. The solenoid 13 controls the valve 16 disposed in the air line M.

Electric current is supplied to the electrical instrumentalities above referred to through the mains 15a and 15b. It will be noted that the normally open contactor 1, armature B3, series field winding B4 and starting resistor and relay mechanism B5 are connected across said electric mains 15a and 15b. Also connected across said mains 15a and 15b is a circuit including the operating coil 2 of contactor 1, the parallel circuits including the push button 3, normally open contact 4 and normally open contactor 5, which parallel circuits are connected to the normally open limit switch 7 and the normally closed contactor 8. Also bridged across the electric mains 15a and 15b is the circuit including the coil 6 on contactor 5, the normally closed contact 10 and parallel circuits including the normally open limit switch 9 and the auxiliary contact 11 on contactor 5. Still another circuit bridged across the mains 15a and 15b includes the scale arm F, contact G and operating coil 12 of contactor 8. Bridged across said coil 12 is a circuit including the solenoid 13 and the limit switch 14, which is responsive to the skip tub H, being closed when the skip tub H is in material receiving position and open at other times.

A mode of operation of the above described embodiment of the present invention is substantially as follows: Let it be assumed that the weigh hopper C is empty, the gate J closed, and the motor B2 for driving the conveyor A and feeder B at rest. When the operator desires to initiate operations, he need only operate the push button 3. It will be understood, of course, that the switch 3, instead of being a manually operable push button, may be responsive to any function of associated apparatus. Closure of the push button 3 completes a circuit from the electric main 15a through the operating coil 2 of contactor 1, through said push button 3, through the limit switch 7 (closed at this time inasmuch as the gate J is closed), through the normally closed contactor 8 to the electric main 15b. Energization of said coil 2 causes contactor 1 to close, which results in the closure of the auxiliary contact 4, bridging the push button 3. Closure of the contactor 1 completes a circuit from the main 15a, through contactor 1, through the armature B3 and field winding B4 of the driving motor B2, through the starting resistor and relay mechanism, to the electric main 15b. The starting resistance will be cut out automatically in the manner well understood to those skilled in the art.

Energization of the armature B3 and field winding B4 will cause the operation of the motor B2 to drive the feeder B1 and conveyor A to deliver material to the weight hopper C. The adjustable, relatively fixed electrical contact G will have been set in position to be engaged by the indicating arm F when a predetermined weight of material has been deposited within said weigh hopper C. When said predetermined weight of material has been deposited in the weigh hopper C, the indicating arm F will have moved in a clockwise direction to a position to make contact with said contact G. The making of this contact completes a circuit from the main 15a through the indicating arm F, contact G and coil 12 to the electric main 15b. Energization of the coil 12 causes the normally closed contactor 8 to open, thus interrupting the circuit of coil 2, causing contactor 1 to open and thereby stopping the motor B2.

The recording mechanism F2 is operated through mechanism which need not be discussed in detail, to make a permanent record of the operations of filling the weigh hopper C to a predetermined weight, or, in other words, will make a permanent record of the operations of the indicating arm F. Expressed in other language, the recording mechanism F2 will make a permanent record of the number and weight of the deliveries over a predetermined period of time of the weigh hopper C. Recording mechanism suitable for the purpose may readily be purchased in the open market.

The four-way valve N may be operated at the will of the operator, but the delivery of air to the cylinder L through the main M is controlled by means of the solenoid operated air valve 16. Unless said air valve 16 is open, the operator is prevented from opening the gate J. Said valve 16 is responsive to the position of the skip tub H, being open only when said skip tub is at the bottom of the inclined track I in position to receive material discharged from the weigh hopper C, and a full load is present in said hopper C. Assuming that the skip tub H is in material receiving position, and assuming that the operator has manipulated the valve N to direct air to the air main M, the valve 16 is controlled by the solenoid 13, which is energized only when the indicating arm F is in position to indicate a predetermined full load within the weigh hopper C and when the limit switch 14 is in closed position, meaning that the skip tub is in material receiving position. Just as soon, therefore (assuming that the operator has turned the valve N in position to direct air to the air line M), as the skip tub is in material receiving position below the hopper C, and the arm F is in engagement with contact G, air will be directed through the valve 16 to the cylinder L, which will operate through the crank K and rod K1 to open the gate J to discharge into the skip tub H. Opening of said gate J causes the normally open limit switch 9 to close, completing a circuit from the electric main 15a through coil 6, through normally closed auxiliary contact 10 on contactor 1 and through normally open limit switch 9 to the main 15b. This causes the contactor 5 to close, and also causes the normally open auxiliary contact 11 on contactor 5 to close, bridging limit switch 9.

Inasmuch as the material in the weigh hopper C has been dumped, the contact between the indicating arm F and the contact G will be broken, deenergizing the coil 12 and causing contactor 8 to close. As the gate J of the weigh hopper C is closed, the normally open limit switch 9 will be opened, but will not affect the circuit of coil 6, since limit switch 9 has been bridged. Simultaneous with the operation of limit switch 9 is the closure of the normally open limit switch 7. Closure of the limit switch 7 completes a circuit from the electric main 15a through the coil 2, through contactor 5, through normally open limit switch 7, through the normally closed contactor 8, to the electric main 15b. Closure of the contactor 1 also closes auxiliary contact 4, bridging contactor 5. Closure of contactor 1 also starts the motor B2, driving the feeder B1 and the conveyor A, causing material again to be deposited in the weigh hopper C. Closure of contactor 1 opens the normally closed auxiliary contact 10, interrupting the circuit of coil 6 and causing contactor 5 to open, but has no effect on the circuit, since this contactor was bridged by the auxiliary contact 4.

As noted above, the solenoid 13 for controlling the valve 16 to open the gate J is energized only when a predetermined load is present in the weigh hopper C and when the skip tub H is in its material receiving position below said weigh hopper. It is impossible, therefore, to dump the contents of hopper C into the skip tub until said hopper is loaded to desired weight. Moreover, it would be impossible to dump the contents of hopper C at any time that the skip tub H is not beneath said hopper.

It will be understood that after the gate J has been opened, the operator may, at any time, operate the valve N to close said gate J. It will be understood, further, that after the operator has started operations by closing the push button 3, the above cycle of operation will be carried through automatically up to the depositing of a predetermined weight of material within the weigh hopper C. Either at this stage or prior to this stage, the operator will move the valve N to admit air to the air line M, whereby air in said air line M will operate the crank K to open the gate J. After the opening of gate J, the skip tub may be hauled up by any preferred means (not shown). After the operator has closed the gate J by manipulating the valve N, a new cycle of operation will be inaugurated and will be carried through as above described.

It will be observed that the present invention provides a system for quickly determining the weight of material being delivered. The operator may set his valve N in position to deliver air to the air line M at any time after having closed the gate J, and may then go about other business while the hopper C is being filled, the weight of material therein recorded and the gate automatically opened. The time of the operator is therefore conserved. The present invention also has the decided advantage that dumping may not be accomplished except when a predetermined load is within the weigh hopper and except when the skip tub is in a position to receive the material from the weigh hopper. Inaccuracies due to the dumping of an incomplete load are avoided, and possibilities of dumping from the weigh hopper C when the tub is not in position to receive the material from said weigh hopper are avoided.

Briefly stated, the following interlocks are provided: (1) The contents of the hopper C cannot be dumped unless the skip tub H is in material receiving position; (2) the contents of said hopper C cannot be dumped unless said hopper is filled to the required weight; (3) the contents of the hopper C cannot be dumped while material is being fed into same; (4) the delivery of material into the hopper C will be stopped as soon as a predetermined weight has been reached; (5) the conveyor A cannot be restarted until the gate J has been opened and closed; and (6) as soon as the gate J has been closed, the conveyor A will be started and material will again be deposited into the hopper C.

Though a preferred embodiment of the present invention has been described in detail, many modifications will occur to those skilled in the art. It is intended to cover all such modifications that fall within the scope of the appended claims.

I claim:

1. In combination, a receptacle, gate means for controlling the discharge of material from said receptacle, control means for selectably applying opposed forces to said gate means to open or close said gate means, weighing means for measuring the weight of material within said receptacle, receiving means for receiving material discharged from said receptacle, means for delivering material to said receptacle, motive means for said delivery means, means responsive to said weighing means and said receiving means for governing said control means, and means responsive to said weighing means and to the position of said gate means for governing said motive means.

2. Blast furnace charging equipment comprising, in combination; a bin for storing an ingredient to be charged therein; a power driven feeder associated with said bin for effecting, upon operation thereof, withdrawal of said ingredient; a hopper into which said feeder discharges, said hopper being provided with a gate which, when in open position, permits the contents of said hopper to pass out therefrom; a power operator for said gate; a blast furnace skip hoist having the loading position for one skip thereof arranged so that the contents of said hopper, when said hopper gate is opened, discharges into said skip at said loading position thereof; mechanism effective to determine the weight of said ingredient in said hopper; means controlled by the presence of said skip at said loading position when said hopper is filled with the requisite amount of said ingredient, as determined by said mechanism, to effect the opening of said hopper gate by said power operator so as to discharge the contents of said hopper into said skip; and also for causing after said hopper gate is moved to closed position, the operation of said power driven feeder until said hopper is refilled with the requisite amount of said ingredient.

3. Blast furnace charging apparatus wherein equipment is provided for automatically conveying a primary ingredient from a storage bin, loading the proper amount thereof at the proper time into a blast furnace skip bucket, said equipment comprising a skip hoist including a skip bucket; a power driven feeder associated with said bin for effecting, upon operation of said feeder, withdrawal of said ingredient; a hopper into which said feeder discharges, said hopper being provided with a gate which, when in open position, permits the contents of said hopper to pass out therefrom into said skip bucket in the loading position of said skip hoist; a power operator for said gate; mechanism effective to determine the weight of said ingredient in said hopper; means responsive to the arrival of said skip bucket at said loading position for effecting, in the event said hopper is filled with the requisite amount of said ingredient, the opening of said hopper gate by said power operator, so as to discharge the contents of said hopper into said skip bucket; and also for causing, after said hopper gate is moved to closed position, the operation of said power driven feeder until said hopper is refilled with the requisite amount of said ingredient.

4. Blast furnace charging equipment comprising, in combination, a bin for storing an ingredient to be charged therein, a feeder associated with said bin for effecting, upon operation thereof, withdrawal of said ingredient, a hopper into which said feeder discharges, said hopper being provided with a gate which when in open position permits the contents of said hopper to pass out therefrom, a power operator for said gate, a blast furnace skip hoist having the loading position for one skip thereof arranged so that the contents of said hopper, when said hopper gate is opened, discharges into said skip at said loading position thereof, mechanism effective to predetermine the weight of said ingredient delivered to said hopper by said feeder, means controlled by the presence of said skip at said loading position when said hopper is filled with the requisite amount of said ingredient, as determined by said mechanism, to control the opening of said hopper gate by said power operator so as to discharge the contents of said hopper into said skip and also for causing, after said hopper gate is moved to closed position, the operation of said feeder to discharge material from said bin until said hopper is refilled with the requisite amount of said ingredient.

5. Blast furnace charging apparatus wherein equipment is provided for automatically discharging a primary ingredient from a storage bin, loading the proper amount thereof at the proper time into a blast furnace skip bucket, said equipment comprising a skip hoist including a skip bucket, a motor operated feeder associated with said bin for effecting, upon operation of said feeder, withdrawal of said ingredient, a hopper for receiving material from said bin, said hopper being provided with a gate which when in open position permits the contents of said hopper to pass out therefrom into said skip bucket in the loading position of said skip hoist, a power operator for said gate, mechanism effective to predetermine the weight of said ingredient delivered to said hopper from said bin, means responsive to the arrival of said skip bucket at said loading position for controlling, in the event said hopper is filled with the requisite amount of said ingredient, the opening of said hopper gate by said power operator, so as to discharge the contents of said hopper into said skip bucket, and also for causing, after said hopper gate is moved to closed position, the operation of said motor driven feeder to effect discharge of said primary ingredient from said bin until said hopper is refilled with the requisite amount of said ingredient.

EDGAR P. EVERHARD.